US012587669B2

(12) United States Patent　　　(10) Patent No.:　US 12,587,669 B2

Racape et al.　　　　　　　　　　(45) Date of Patent:　　Mar. 24, 2026

(54) MOTION FLOW CODING FOR DEEP LEARNING BASED YUV VIDEO COMPRESSION

(71) Applicant: INTERDIGITAL VC HOLDINGS, INC., Wilmington, DE (US)

(72) Inventors: Fabien Racape, San Francisco, CA (US); Jean Begaint, Menlo Park, CA (US); Simon Feltman, Sunnyvale, CA (US); Akshay Pushparaja, San Jose, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 184 days.

(21) Appl. No.: 18/281,839

(22) PCT Filed: Mar. 16, 2022

(86) PCT No.: PCT/US2022/020503

§ 371 (c)(1),
(2) Date: Sep. 13, 2023

(87) PCT Pub. No.: WO2022/197771

PCT Pub. Date: Sep. 22, 2022

(65) Prior Publication Data

US 2024/0155148 A1　　May 9, 2024

Related U.S. Application Data

(60) Provisional application No. 63/162,779, filed on Mar. 18, 2021.

(51) Int. Cl.
H04N 19/513　　(2014.01)
H04N 19/132　　(2014.01)
(Continued)

(52) U.S. Cl.
CPC ......... H04N 19/513 (2014.11); H04N 19/132 (2014.11); H04N 19/177 (2014.11); H04N 19/186 (2014.11); H04N 19/52 (2014.11)

(58) Field of Classification Search
None
See application file for complete search history.

(56) References Cited

U.S. PATENT DOCUMENTS

| | | | |
|---|---|---|---|
| 2019/0373293 A1* | 12/2019 | Bortman | .............. H04N 19/176 |
| 2022/0272355 A1* | 8/2022 | Singh | .................. H04N 19/186 |

FOREIGN PATENT DOCUMENTS

| | | |
|---|---|---|
| WO | 2020016857 | 1/2020 |
| WO | 2020216438 | 10/2020 |

OTHER PUBLICATIONS

Lin et al., Face Parsing With RoI Tanh-Warping, 2019 IEEE/CVF Conference on computer Vision and Pattern Recognition (CVPR), IEEE, Jun. 15, 2019, pp. 5647-5656 (Year: 2019).*

(Continued)

*Primary Examiner* — Kaitlin A Retallick

(74) *Attorney, Agent, or Firm* — Ronald Kolczynski

(57) ABSTRACT

Video encoding and decoding is implemented with auto encoders using luminance information to derive motion information for chrominance prediction. In one embodiment YUV 4:2:0 video is encoded and decoded in which luminance information is downsampled to generate predictions from chrominance components of a reference frame. In a related embodiment, more than one reference frame is used for predictions. In another embodiment, convolutions and transpose convolutions implement derivation of motion information.

19 Claims, 16 Drawing Sheets

(51) Int. Cl.
    *H04N 19/177*      (2014.01)
    *H04N 19/186*      (2014.01)
    *H04N 19/52*       (2014.01)

(56)            References Cited

OTHER PUBLICATIONS

Agustsson, et al., Scale-Space Flow for End-to-End Optimized Video Compression, 2020 IEEE/CVF Conference on Computer Vision and Pattern Recognition (CVPR), Jun. 13-19, 2020, pp. 8503-8512.
Li et al., AHG11: Updated Information on Inter-Prediction Coding Tool With Deep Neural Network, 21. JVET Meeting, Jan. 6, 2021-Jan. 15, 2021, Teleconference, (The Joint Video Exploration Team of ISO/IEC JTC1/SC29/WG11 and ITU-T SG. 16), No. JVET-U0087-v2, 05 Jan. 5, 2021.
Lin et al., Face Parsing With Rol Tanh-Warping, 2019 IEEE/CVF Conference on computer Vision and Pattern Recognition (CVPR), IEEE, Jun. 15, 2019, pp. 5647-5656.
Beck et al., Exploring Prediction Uncertainty in Machine Translation Quality Estimation, ARXIV.Org, Cornell University Library, Jun. 30, 2016.

* cited by examiner

1100

1300

MOTION FLOW CODING FOR DEEP LEARNING BASED YUV VIDEO COMPRESSION

CROSS REFERENCE TO RELATED APPLICATIONS

This application is a U.S. National Stage Application under 35 U.S.C. 371 of International Patent Application No. PCT/US2022/020503, filed Mar. 16, 2022, which is incorporated herein by reference in its entirety This application claims the benefit of U.S. Application No. 63/162,779, filed Mar. 18, 2021 which is incorporated herein by reference in its entirety.

TECHNICAL FIELD

At least one of the present embodiments generally relates to a method or an apparatus for compression of images and videos using Artificial Neural Network (ANN) based tools.

BACKGROUND

The Joint Video Exploration Team (JVET) between ISO/MPEG and ITU is currently studying tools to replace some modules of the latest standard H.266/VVC, as well as the replacement of the whole structure by end-to-end auto-encoder methods.

SUMMARY

At least one of the present embodiments generally relates to a method or an apparatus for compression of images and videos using Artificial Neural Network (ANN) based tools.

According to a first aspect, there is provided a method. The method comprises steps for: concatenating luminance data of a current and at least one reference block; determining motion information from the concatenated luminance data; encoding said determined motion information; down sampling said encoded motion information; determining a prediction of chrominance data based on said downsampled encoded motion information and chrominance data of the at least one reference block; determining a prediction of luminance data based on said encoded motion information and luminance data of the at least one reference block; determining residual data of the current block based on said predictions; and, encoding said residual data into a bitstream also comprising said encoded motion information.

According to a second aspect, there is provided a method. The method comprises steps for: decoding motion information from a bitstream; down sampling said decoded motion information; determining a prediction of chrominance data based on said downsampled decoded motion information and chrominance data of at least one reference block; determining a prediction of luminance data based on said decoded motion information and luminance data of the at least one reference block; decoding residual information; and, reconstructing a video block using said decoded residual information and said predictions.

According to another aspect, there is provided an apparatus. The apparatus comprises a processor. The processor can be configured to implement the general aspects by executing any of the described methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

In recent years, novel image and video compression methods based on neural networks have been developed.

Contrary to traditional methods which apply handcrafted prediction modes and transforms, ANN-based methods rely on parameters that are learned on a large dataset during training, by iteratively minimizing a loss function. In a compression case, the loss function describes both the estimation of the bitrate of the encoded bitstream, and an objective function of the decoded content. Traditionally the quality of the reconstructed image is optimized, for example based on the measure of the signal distortion or an approximation of the human-perceived visual quality.

Figure 1:
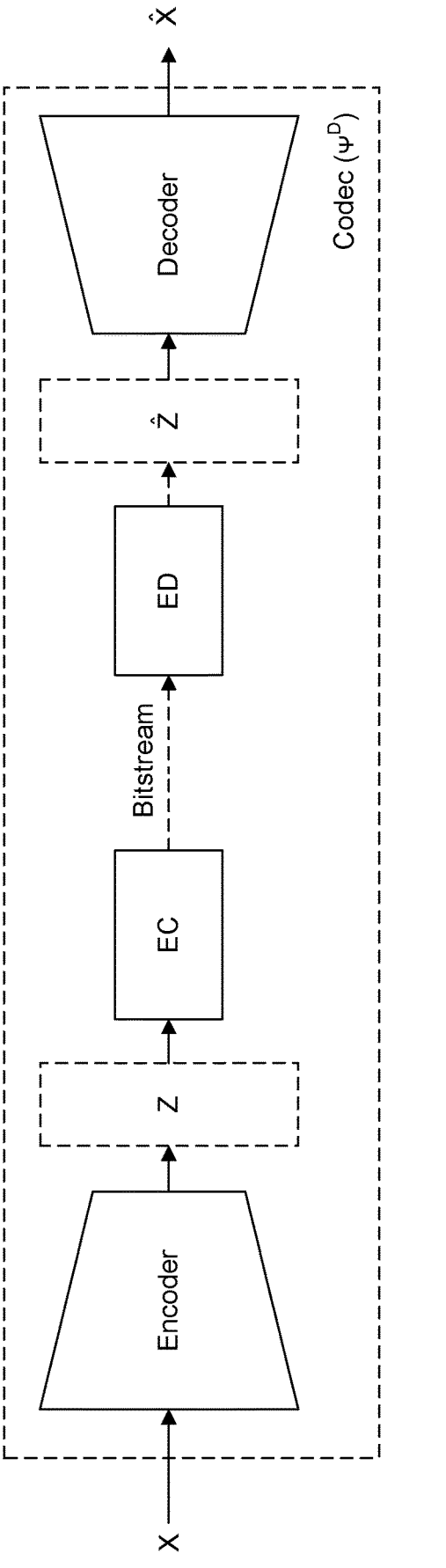
FIG. 1 illustrates a basic auto-encoder chain.

In FIG. 1, we show an exemplary end-to-end compression system. The input X to the encoder part of the network can consists of an image or frame of a video, a part of an image a tensor representing a group of images/frames a tensor representing a part (crop) of a group of images/frames.

In each case, the input can have one or multiple color components, e.g.: monochrome, RGB or YCbCr (YUV) components.

1. The input tensor X is fed into the encoder network. The encoder network is usually a sequence of convolutional layers with non-linear activation functions. Large strides in the convolutions or space-to-depth[1] operations can be used to reduce the spatial resolution while increasing the number of channels. The encoder network can be seen as a learned analysis transform.

[1] Reshaping and permutation, for example a tensor of size (N, H, W) is reshaped and permuted to (N*2*2, H//2, W//2)

2. The output of the encoder network, the "features map" or "latent" Z, is quantized and entropy coded (EC) as a binary stream (bitstream) for storage or transmission.

3. The bitstream is entropy decoded (ED) to obtain Z_q, the quantized version of Z.

4. The decoder network generates $Z_q$, an approximation of the original X tensor decoded from the latent $Z_q$. The decoder network is usually a sequence of up-sampling convolutions (e.g.: "deconvolutions" or convolutions followed by upsampling filters) or depth-to-space operations. The decoder network can be seen as a learned synthesis transform, as well as a denoising and generative transform.

Note that more sophisticated architectures exist, for example adding a "hyper-autoencoder" (hyper-prior) to the network in order to jointly learn the parameters of the latent distribution for efficient compression. This invention is not limited to the use of autoencoders. Any end-to-end differentiable codec can be considered.

Video Coding

Traditional Video Compression

To remove the redundancies between frames of video sequences, traditional video coding methods include inter prediction tools. The images are partitioned into blocks.

For each block to be encoded, a motion estimator tries to find a predictor in a previously reconstructed reference picture. A pure translation is traditionally considered, the motion estimator parses blocks of the same shape within a window co-located with the current block to predict. When the best match is found, the motion vector, i.e., the horizontal and vertical coordinate differences between the current block's location and its predictor, is coded and transmitted in the bitstream with the index of the reference picture. The difference between the source block and the predictor, also called residual, is generally transformed, quantized and entropy coded in the bitstream.

At the decoder, the motion information as well as the residuals are decoded. The predictor is accessed in the signaled reference frame, using the decoded motion vector. The decoded block is then constructed by adding the decoded residual to the predictor.

In this scheme, the encoder performs the complex task of finding a best-matching block within a window in the reference frame, centered at the current block's location. The decoder just needs to parse the motion information.

The approximation made lies in the assumption that textures in the blocks are rigid, as the predictor block is copied from the reference frame, without considering any deformations. The codecs are based on the partitioning into blocks. The encoder will naturally choose blocks whose shapes and sizes lead to a satisfactory motion compensation, i.e., optimizing the size of the residuals versus quality of the reconstructed images. For example, highly dynamic and deformable textures (tree leaves, water etc.) will require very small blocks such that the rigid motion compensation works.

One can see the limits of the model here, where only translations of blocks are considered. Even the rotation or the scaling of textures from one frame to another are not considered in the motion models. A lot of approaches have been tried out, including extended motion parametrizations such as the affine model with 6 parameters coding for translation, rotation and scaling. However, the compression gains have never made worth the increased complexity at both encoding and decoding sides.

Video Compression Using Artificial Neural Networks

In this section, we detail state-of-the-art video compression methods based on artificial neural networks which serves as base model for the description of the invention. They rely on autoencoder architectures to encode the different elements and tackle the removal of inter-frame redundancies by computing an optical flow, which estimates a dense motion flow between frames, i.e., each pixel location is assigned a distinct 2d motion vector (horizontal and vertical).

Coupled with traditional block based inter prediction and residual coding, optical flow has so far failed to show benefits over the previously described block-based methods at a reasonable complexity. However, recent works using autoencoders to encode the motion fields have shown promising results.

Figure 2:
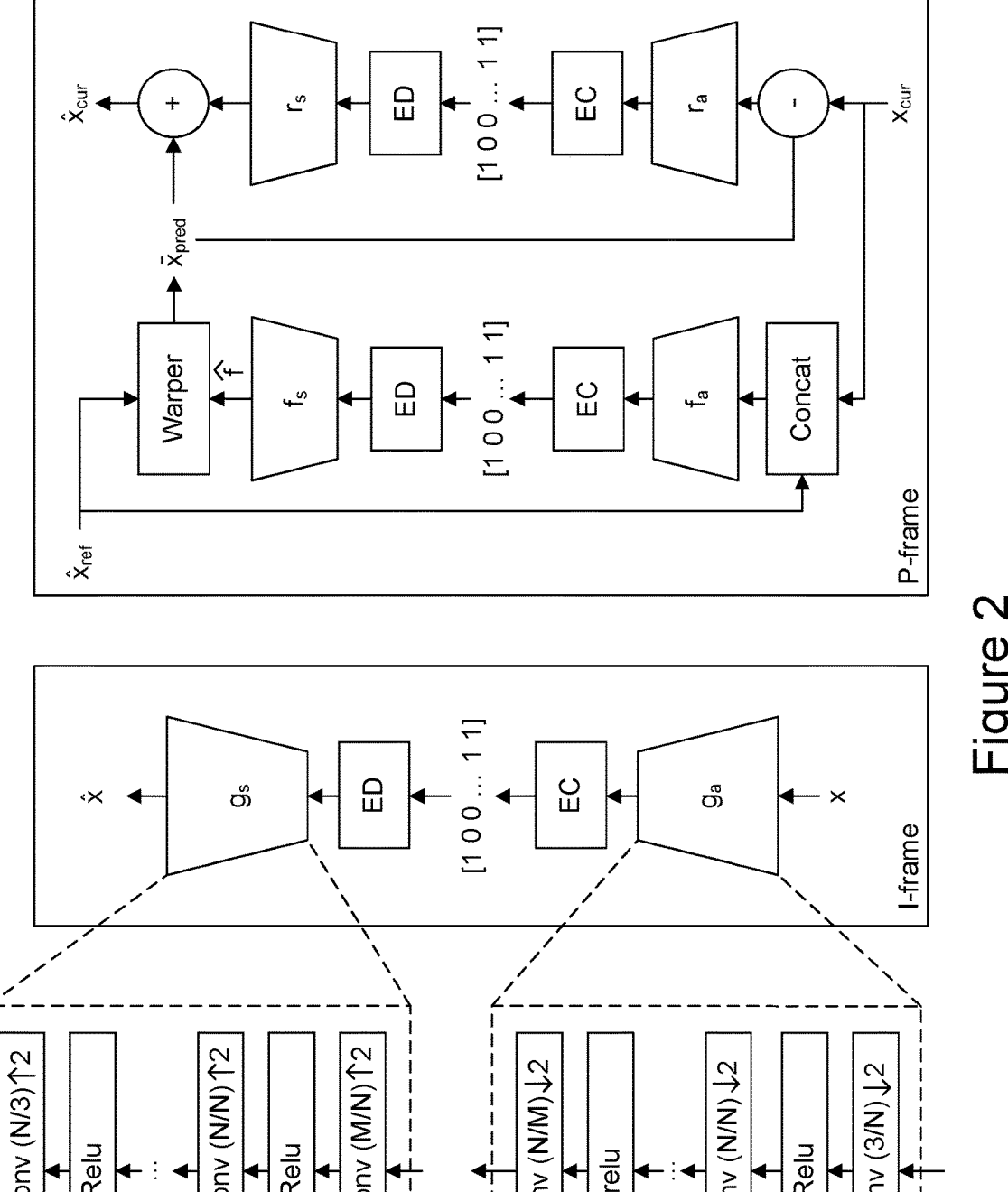
FIG. 2 illustrates an architecture by Agustsson et al. for compressing video frames.

In FIG. 2, we show the general architecture presented in a prior approach. The I-frame on the left represents the encoding of key-frames which are independently (Intra) encoded. They undergo a standard autoencoder image compression scheme composed of convolutional analysis and synthesis modules (g, $g_s$). On the left is shown exemplary analysis/synthesis blocks. At the encoder, convolutions with stride transform the 3×h×w transform image to a Latent tensor Z of size N×h/n×w/n. A convolution for example noted 5×5 cony (N/M) $\downarrow2$ where 5×5 denotes the convolution kernel size, N and M are the input and output numbers of channels, respectively, and $\downarrow2$ corresponds to a stride of 2, which will output a tensor of spatial dimensions divided by two. Convolutions can be interleaved with activation functions such as Rectified Linear Unites, as in the exemplary figure. At the decoder, convolutions are replaced by transpose convolutions, denoted trconv. At the inference, an Entropy Coder (EC) and an Entropy Decoder (ED) are used to arithmetically remove redundancies. Other predicted (P) frames are encoded following the process on the right. At the encoder, the inputs are the current frame $x_{cur}$ and a previously reconstructed reference frame $\hat{x}_{ref}$. Both images are used to derive and encode the motion information. They are concatenated as a unique tensor which is the input of the motion flow autoencoder ($f_a$, $f_s$) which produces a reconstructed flow $\hat{f}$. The latter is used to warp the reference frame $\hat{x}_{ref}$ onto the current, since the decoder will have access to the reconstructed flow only. This produces a predictor for the current frame $x_{pred}$. The residual, corresponding to $x_{cur}$-$\bar{x}_{pred}$ is then encoded by ($r_a$, $r_s$). The reconstructed residual is finally added to the reconstructed prediction to form the decoded image $\hat{x}_{cur}$. The bitstream, denoted by [1 0 0 . . . 1 1] in FIG. 2 is then composed of codes representing either the latent representation of I-frames, of the latent representations of the motion field and the residuals in the case of predicted frames.

Figure 3:
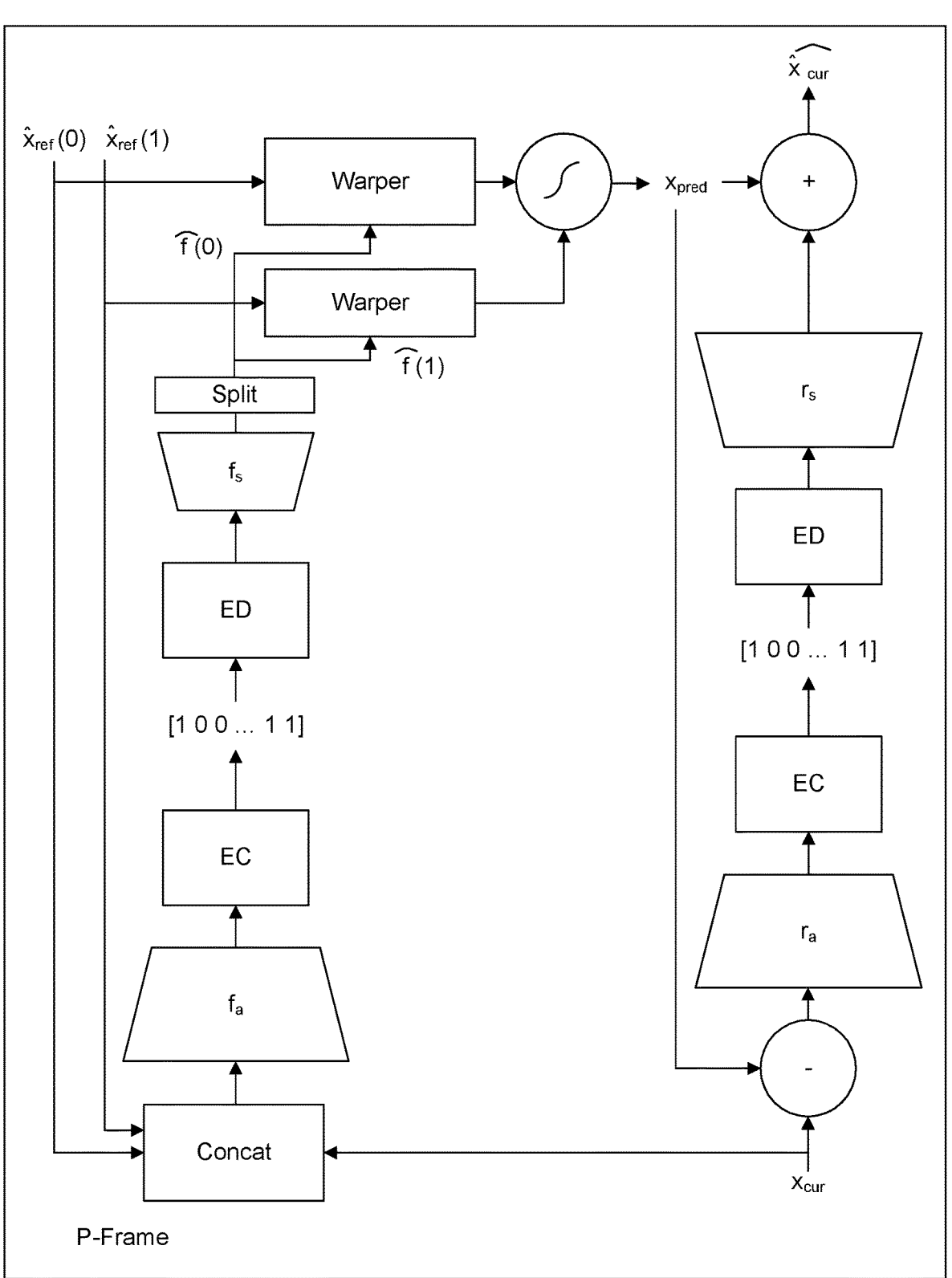
FIG. 3 illustrates proposed structure with two reference pictures.

FIG. 3 shows a structure when using 2 reference frames, which can be past or future frames in display order, but past frames in coding order, since they need to be previously reconstructed. The first difference with the above description is located at the concatenation operation, which takes 3 images (Luminance components) as input. The second is that each reference frame is mapped separately, the predicted frame corresponds to a linear combination of each mapped reference. A mask can be used to spatially blend each sample separately.

This invention aims at solving the problem of optimizing the compression of videos by minimizing the size of the transmitted bitrate, while keeping the highest quality possible. In particular, existing differential neural-network-based motion estimation and compensation methods directly compute the optical flow and the prediction on videos represented in RGB format. However, most video content is represented in YUV 4:2:0 format, i.e., the U and V components have half the size in width and height of the Y channel. It is in this case impossible to process the input as a 3×h×w tensor, where h and w represent the height and width of the image, respectively.

This document describes methods and embodiments for improving the motion estimation and coding in the case of specific video color formats which store luminance and chrominance channels at different resolutions.

Conventional Coding

Traditional video coding methods rely on block-based motion estimation as detailed in section 1. This design relies on the assumption the motion between frames can be modeled by a simple translation for each block. The encoder chooses the block partitioning that minimizes the residuals that need to be transmitted to correct the error made by this modeling.

Differentiable Flow-Based Video Compression

Recent works have shown the promises of using deep models for estimating and encoding dense motion flow between frames of videos. However, existing methods usually rely on the RGB color format to derive the motion flow. An earlier section describes the main types of architectures.

This invention proposes to compute the motion flow using the Luma component only (Y), and then derive the models necessary to efficiently compress the chrominance (Cb/Cr or UN components).

Main Embodiment

In this invention, as it is proposed to compute the motion information using the luminance component only, the luma and the chroma components of the reference image can be warped onto the current image separately. This is especially relevant when luminance and chrominance have a different resolution.

FIG. 2 shows the main embodiment of the proposed method in which only the luminance component of the current and reference frames is used to compute and encode the motion field. The motion of the chrominance components is directly derived from the luminance motion. In the following, only one frame is used as reference to predict the current frame to encode. Note that the proposed invention focuses on the utilization of the characteristics of the luminance/chrominance representation and is not limited to the case of inter prediction using a single frame.

The current frame to encode $$x_{cur}^{YUV}$$

and previously reconstructed reference frame $$\hat{x}_{ref}^{YUV}$$

are the input of the process. The luminance component of each frame $$\left( x_{cur}^{Y}, \hat{x}_{ref}^{Y} \right)$$

are used to compute the motion. They are first concatenated to produce a tensor of size 2×h×w where h and w denote the height and width of the frames, respectively. The motion, i.e., the horizontal and vertical components of the displacement of each sample, is then computed, which then also corresponds to a 2×h×w tensor.

The residual $$r_{cur}^{YUV}$$

is obtained by subtracting the predicted values from the current source image at the encoder.

$$r_{cur}^{YUV} = x_{cur}^{YUV} - x_{pred}^{YUV}$$

Like images and motion information, they can be encoded using an autoencoder architecture. This process is usually lossy, which means that the reconstructed residual $$\hat{r}_{cur}^{YUV}$$

is not equal to the previously constructed residual $$r_{cur}^{YUV}.$$

For each inter-predicted image, the bitstream then contains 2 main encoded tensors coding for the motion and the residuals of the prediction.

The reconstructed current frame finally corresponds to:

$$\hat{x}_{cur}^{YUV} = x_{pred}^{YUV} + \hat{r}_{cur}^{YUV}$$

It can be stored in a decoded picture buffer to serve as reference for a later predicted frame. As Group Of Pictures (GOP) structures may rely on bi-predictive coding, the order of coding and order of display may be different, the current decoded frame is then stored until it is displayed and does not serve as reference anymore.

Figure 5:
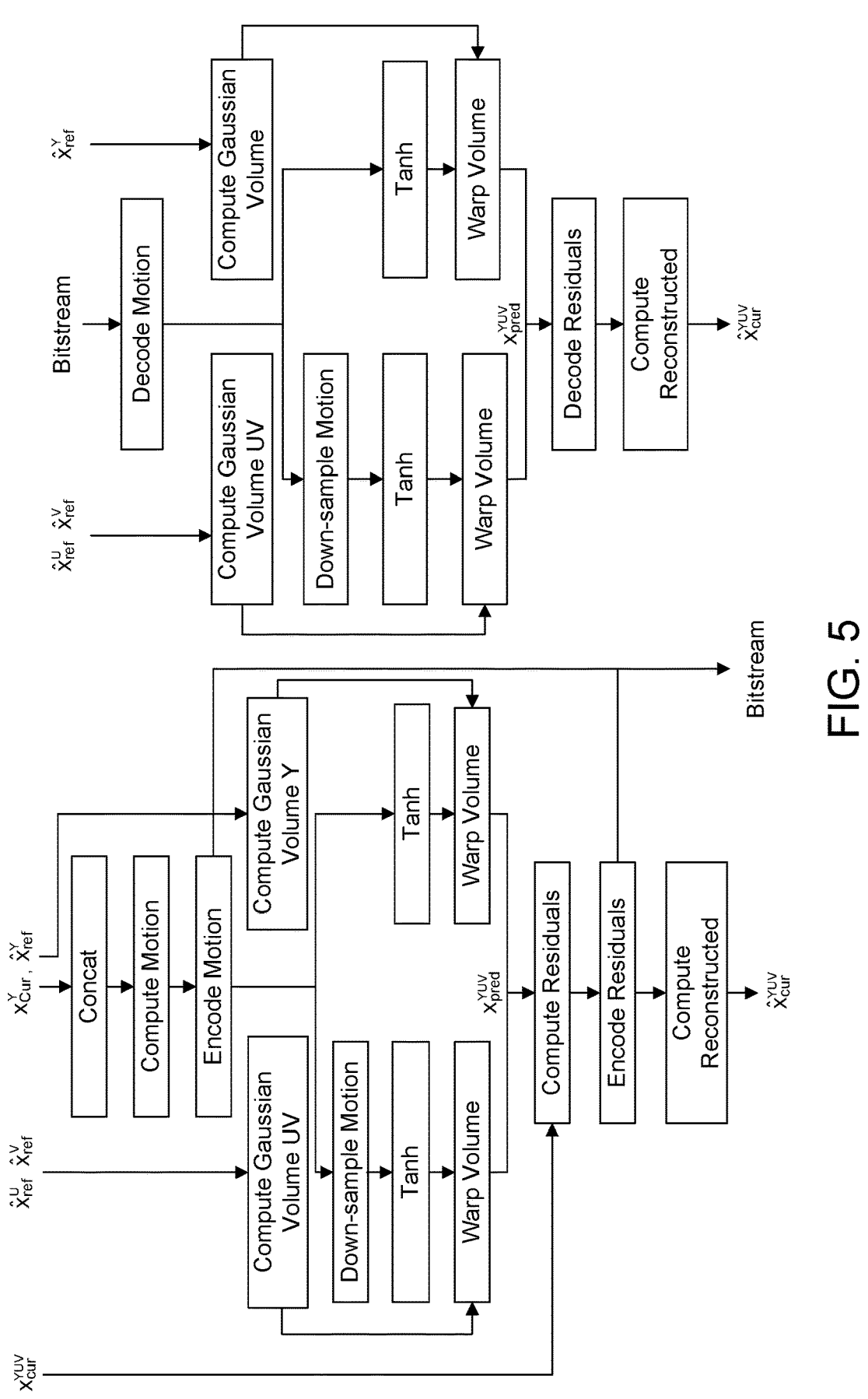
FIG. 5 illustrates a flow diagram of a proposed method in the context of scale-flow prediction of encoding (left) and decoding (right) for inter mode.

Optionally, as shown in FIG. 5, a component can be added, also called scale field which aims at introducing blur when flow-based prediction is not good enough, e.g., when occlusions or objects moving out of bounds. This motion tensor can also be encoded using a convolutional autoencoder with an entropy bottleneck. The output of this stage consists of a tensor containing the vector components and an optional field scale.

Each of the values of both tensors can be the input of a transformation y=tanh x which outputs a signal included in the range [−1, 1]. Together with the reconstructed reference frame, these tensors are used as input to the warping operation, to produce the predicted image $$x_{pred}^{YUV}.$$

Figure 4:
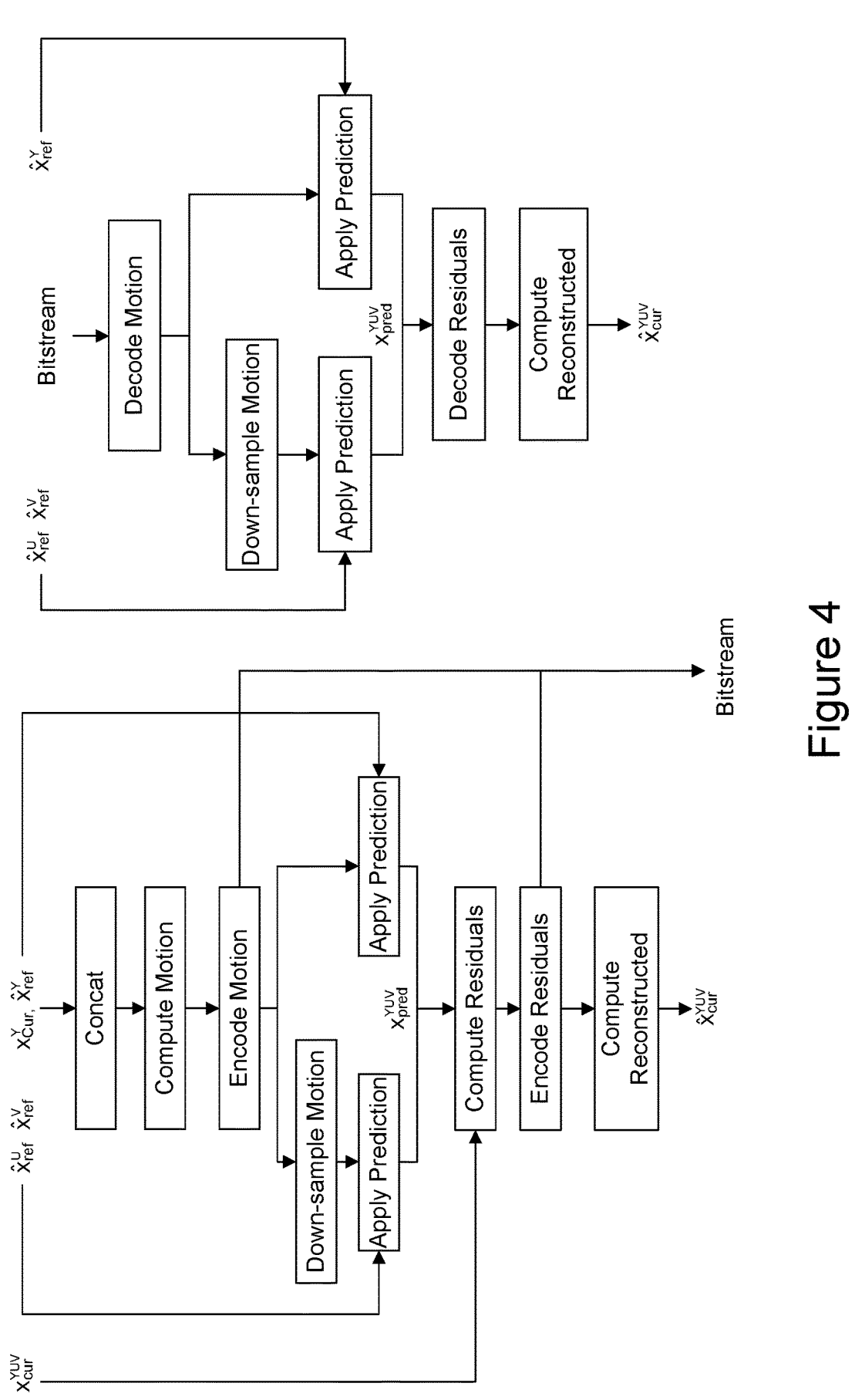
FIG. 4 illustrates a flow diagram of a method of encoding (left) and decoding (right) a frame in inter mode.

During the warping, the range [−1, 1] of the motion corresponds to motion vectors with the ranges [−width, width], respectively [−height, height] for the horizontal, respectively vertical, component of each sample's displacement. In the previous section, we called 'sample' displacements, instead of 'pixel', to specify the value of each component of the image. A pixel corresponding to location on a displayed image, i.e., it can have a triplet of values in the case of RGB or YUV representation. In particular in the case of YUV 4:2:0 format, the size of U and V component is width/2 and height/2. The absolute displacements of each chrominance sample then corresponds to half of those for the Y component. A down-sampling operation is necessary to derive a motion information at the correct size for the chrominance, as shown in FIG. 4. This down sampling operation can consist of any down-sampling filter such as for example:

an average pooling, i.e., each chrominance displacement is the average of the 4 corresponding values in the Luminance tensor Any stride convolution, or series of convolutions, which outputs a tensor at the correct size for the chrominance. As an example, it is proposed to use a convolution 3×3 with a stride of 2. The weights are learned during training, which helps catching the phase between Y and UN displacements.

First, a down-sampling operation is necessary to derive a motion information at the correct size for the chrominance, as shown in FIG. 4. This down sampling operation can consist of any down-sampling filter such as for example:

an average pooling, i.e., each chrominance displacement is the average of the 4 corresponding values in the Luminance tensor Any stride convolution, or series of convolutions, which outputs a tensor at the correct size for the chrominance. As an example, it is proposed to use a convolution 3×3 with a stride of 2. The weights are learned during training, which helps catching the phase between Y and UN displacements.

Second, the tanh function and the warping taking motion information relative to the size of the input tensor, the warping operation then receives the proper form of tensor.

Figure 6:
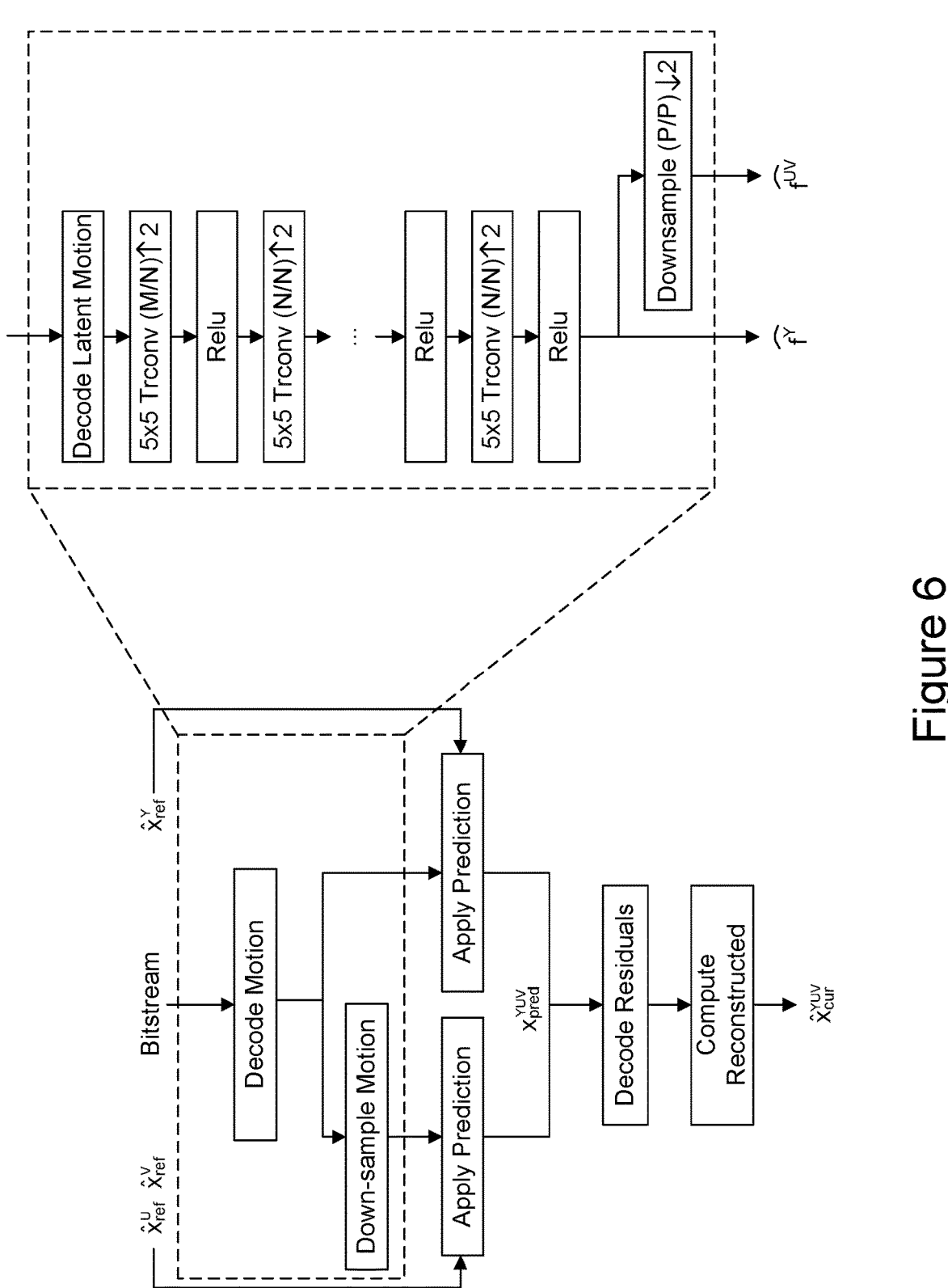
FIG. 6 illustrates details of the proposed decoding process for inter mode.

FIG. 6 shows the process at decoder side for a current frame in inter mode. The bitstream is parsed to decode the required information:

Which reference image(s) are used,

The motion tensors(s),

The residual

As can be seen in FIG. 6, the decoding follows a convolutional structure as described in FIG. 2, where transpose convolution finally produces a P×h×w tensor for luma and $$P \times \frac{h}{2} \times \frac{w}{2}$$

for the chroma. In the simple case of basic optical flow, P=2, i.e. the vertical and horizontal components of the samples' displacements. When more elaborated approaches are used such as the space-scale flow described above, P can be 3, including the blur feature.

In the following, we describe the process in the case of a single reference frame.

The decoded motion and the reference frame are input to the warping operation which outputs the predicted frame.

Like at the encoder that needs to reconstruct the frames for predicting later frames, the reconstructed current frame is computed as $$\hat{x}_{cur}^{YUV} = x_{pred}^{YUV} + \hat{r}_{cur}^{YUV}$$

Figure 7:
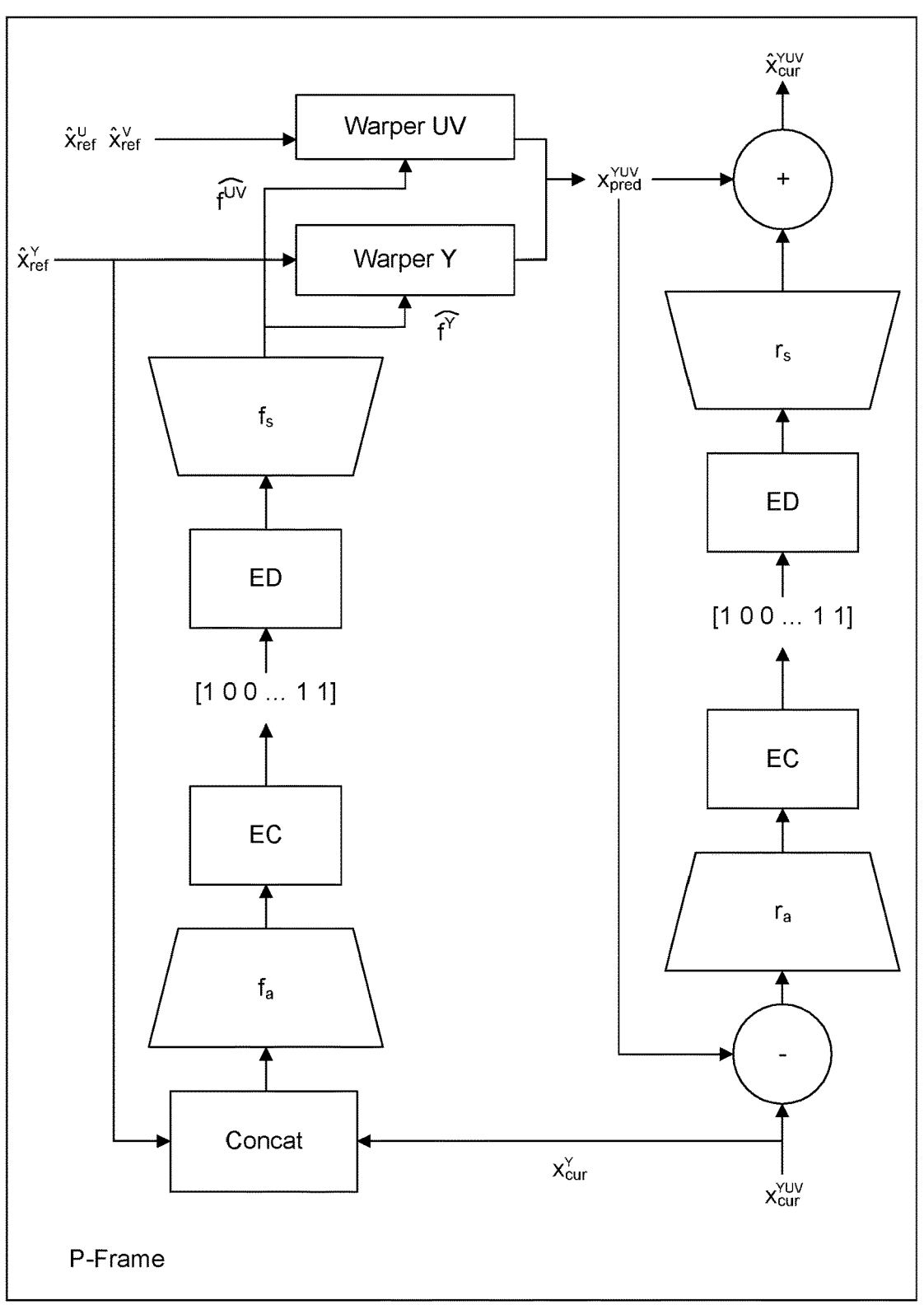
FIG. 7 illustrates a proposed autoencoder structure of encoding and decoding using two reference frames and separate warping for luminance and chrominance.
Figure 8:
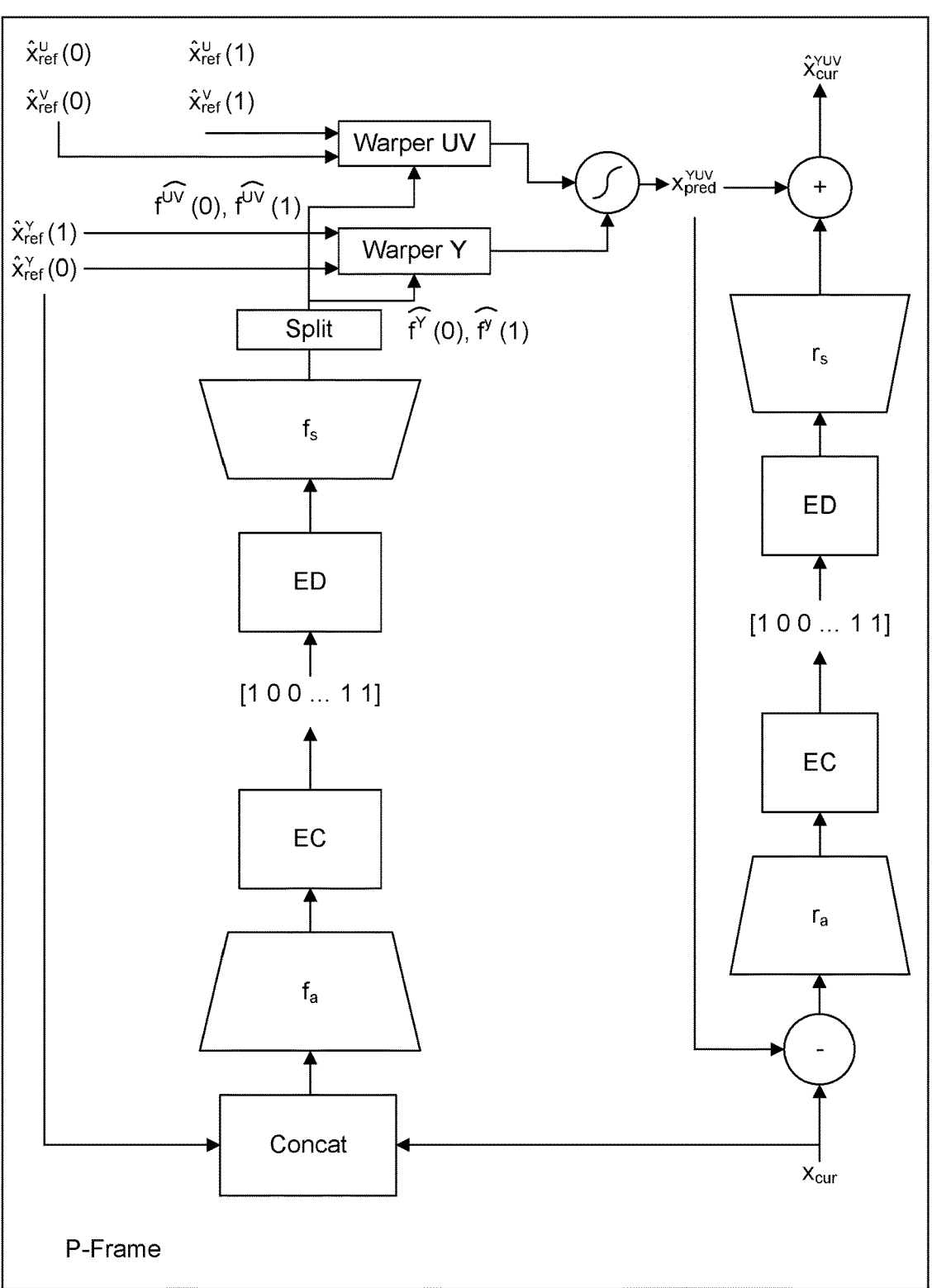
FIG. 8 illustrates a proposed structure in case of bi-directional prediction.

To highlight the proposed modifications to the general framework in FIG. 2, FIG. 7 shows the full autoencoder-based structure as described above, where the warping is separate for the Luminance (Y) and the chrominance (UV) to produce the predicted frame $$x_{pred}^{YUV}.$$

As mentioned earlier, the proposed method is compatible with any inter-prediction scheme and structures of groups of images. FIG. 7 shows an exemplary case where 2 frames are used as reference, as in FIG. 3. This structure is a natural combination of the one from FIG. 3 with the proposed architecture where Y and UV are warped separately.

Specific Case YUV 4:4:4

Figure 9:
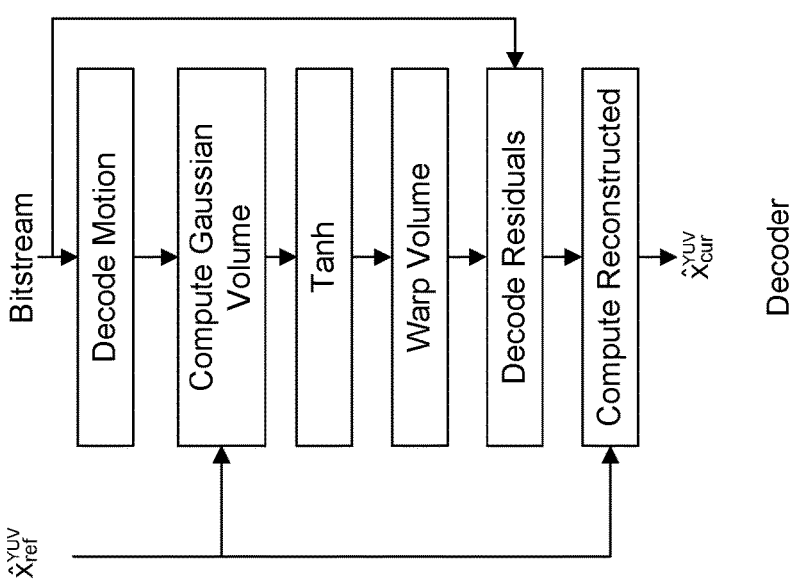
FIG. 9 illustrates YUV 4:4:4 encoding (left) and decoding (right) using motion flow calculated on Y only.
Figure 9:
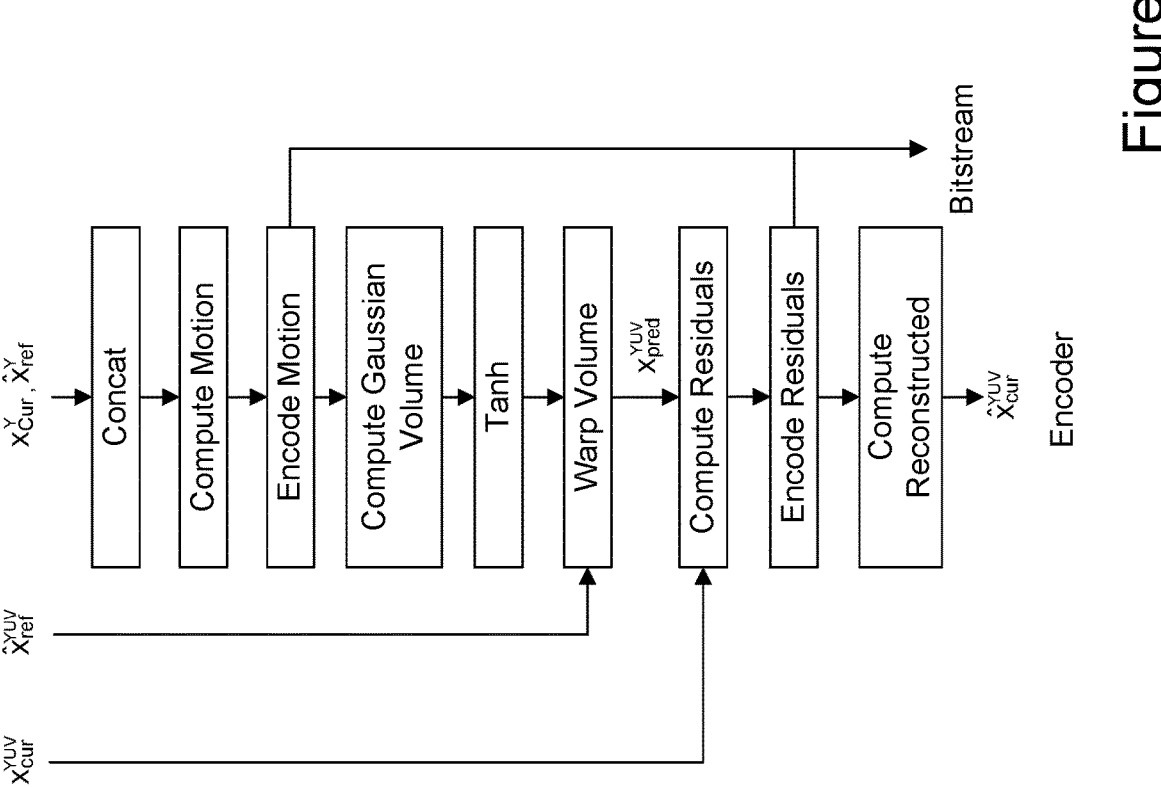

In the case where the content is represented in YUV 4:4:4 mode. Even if the content can be represented as a 3D tensor like RGB format, it may still be relevant to compute the motion flow using the luminance only, which usually contains the main features necessary to estimate the motion. In that case, only the input of the motion flow computation is changed, as shown in FIG. 9 is the case of scale-space motion flow. The rest of the operations process the YUV volume as a 3D tensor, like in state-of-the-art models processing RGB content. It might produce a more consistent motion estimation and reduce the memory footprint and complexity.

To decode the different tensors described above of this bitstream, the decoder requires syntax elements:

For each frame:

Picture mode (Intra, inter)

If the picture is coded in inter mode, the POC (Picture Order Count) of the reference frames used for the prediction. The references are usually stored in a decoder picture buffer, together with their POC to be accessed.

For each tensor to decode, a header contains its ID and potentially the size of the latent if not signaled at the sequence level.

Either the length of the coded bits is also signaled

In this section we describe multiple variants extended from the main invention. Note that unless specified in the description the variants can be combined.

Generic Parametric Inter-Prediction

In the main embodiment we described the use of flow (or space-scale-flow) to generate a predicted image from a reference frame. The flow is estimated based on 2 Y (luminance) components of the reference and current frames. This invention can actually be extended to any parametric method that can be applied on the reference frame to generate a new frame.

The current decoder generates a 2 component (or 3 in the case of space-scale) flow from encoded features map. This can be changed to generate any sets of parameters, as long as the process is differentiable. For example:

the flow can be generated at a lower resolution, and then up sampled to ensure spatial coherence between neighboring pixels.

the flow can be constrained to realistic motion values (for example no more than half or a quarter of the image size can be used as a displacement)

a global compensation: for example, a parametric affine transform or a spline-based photometric transform (in this case where the parametric information is not local to the pixels, the use of pooling and flattening operations in the decoder can easily)

interpolation filters: the kernel of parameters to be convolved directly with the reference frame can be predicted the same way.

Parallel Decoders multiple decoders can be applied in parallel on the same features map to generate any combination of the previously described parametric prediction methods.

the decoders can also be made of a common trunk and multiple heads: for example, a few convolutional layers applied on the features map and then distinct "sub"-decoders applied in parallel. (this is known as "hydranets" in the deep learning literature). In particular, it is proposed to slightly modify the architecture of the network to reserve separated dedicated layers for the luminance and the chrominance components.

In this setting the multi-step prediction process is applied sequentially on the reference frame, the order of operations can be stored for each image in the bitstream and/or follow a fixed order.

Multiple Reference Frames

In the previous embodiments we focused on describing different methods relying on a single reference frame. As mentioned in the main embodiment section, the embodiments can support the use of multiple references frames (we denote n the number of reference frames in the following).

The motion encoder can be modified to take n+1 input components (references+current frames) and generate n sets of prediction methods parameters.

The index of the reference frames used for the current image can be stored in the bitstream or follow a fixed scheme.

The output of the decoder now needs to contain extra information to balance the contributions of the n predicted frames. This can be a set of n $1 \times H \times W$ mask between [0, 1] multiplied to their respective predicted frames, which are then aggregated to construct the final predicted frames. A simple mean operation can also be used. The masks can be used and adapted independently for the luma and chroma components.

Extending the motion encoder inputs In the previous embodiments, the motion encoder only takes Y components as input. This is a severe limitation to traditional video coding where the motion prediction methods have accessed to a lot of additional information based on previous frames and collocated blocks. Here we proposed other variants that extend the information available to the motion encoder (note that this information does not necessarily need to be present at the decoder side, it all depends on the decoder architecture):

The motion encoder can be extended to note only take the reconstructed reference frame as input but also the original version. Then the encoder has access to the original component of the reference frames to estimate the motion information, and the reconstructed reference on which parametric transforms will be applied.

The motion encoder can be extended to use the previously generated "flows" (or their features map) to encode more efficiently the flow information related to the current frame (redundancies in the flows between consecutive frames is expected). This information is also present at the decoder (since it was used for the previous frames) and will be used as "side-information" for the decoder. Some architectures variants:

The encoder features map is merged/concatenated with the previous feature maps.

The input frames are concatenated with the previous flow(s) as new inputs to the encoder.

Separate Convolutions for Decoding Motion Information

Figure 10:
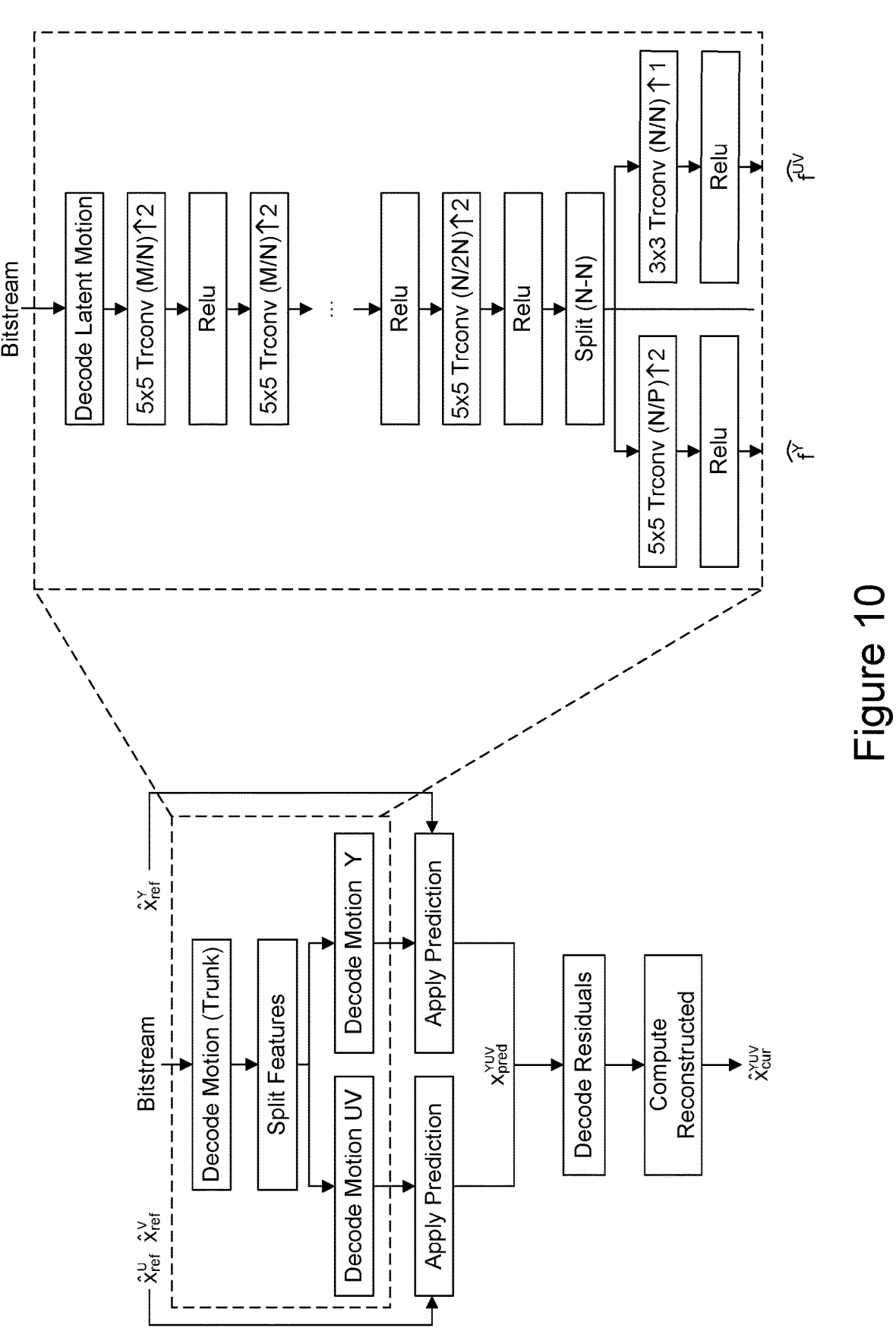
FIG. 10 illustrates a decoder variant with separate layers for luminance and chrominance.

In this variant, instead of adapting the resolution of the motion field of chrominance components in YUV 4:2:0, it is proposed to separate the branches of the decoder part of the model encoding the motion. FIG. 10 shows such decoder architecture where, instead of downsampling the motion computed for the luminance, like in FIG. 6, the decoder is split into 2 branches for the last at least one convolutional layer. In the example of FIG. 10 the tensor output from the last layer common to luminance and chrominance has 2N channels and is split in halves to feed both the luminance and chrominance branches. Contrary to the luminance last transpose convolution that has a stride of 2, the convolution for the chrominance has no stride, which will output a field of same size as the chrominance components. Note that the split and the number of channels can be done differently to keep more channels for the Luminance, for instance.

Figure 11:
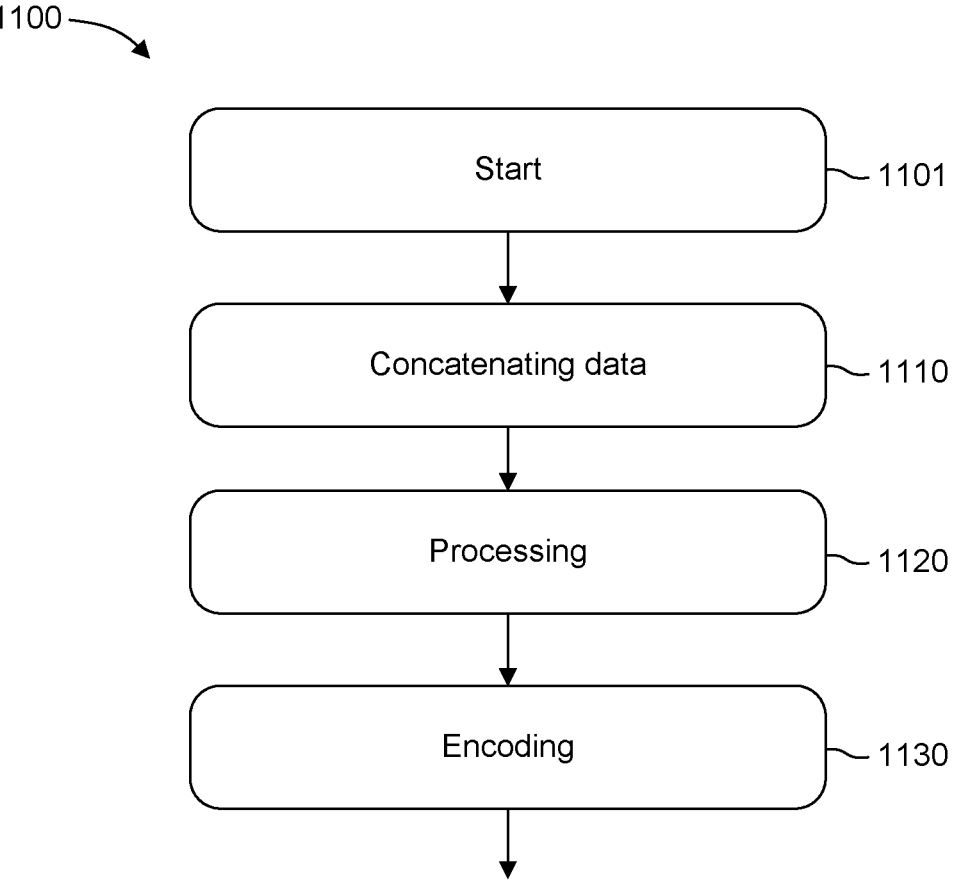
FIG. 11 illustrates one embodiment of a method for encoding video using the present principles.

One embodiment of a method 1100 for encoding is shown in FIG. 11. The method commences at Start block 1101 and proceeds to block 1110 for concatenating luminance data of a current and at least one reference block. The method proceeds to block 1120 for processing. The processing comprises at least one of determining motion information from the concatenated luminance data; encoding said determined motion information; down sampling said encoded motion information; determining a prediction of chrominance data based on said downsampled encoded motion information and chrominance data of the at least one reference block; determining a prediction of luminance data based on said encoded motion information and luminance data of the at least one reference block; and determining residual data of the current block based on said prediction.

The method proceeds to block 1130 for encoding the residual data into a bitstream also comprising the encoded motion information.

Figure 12:
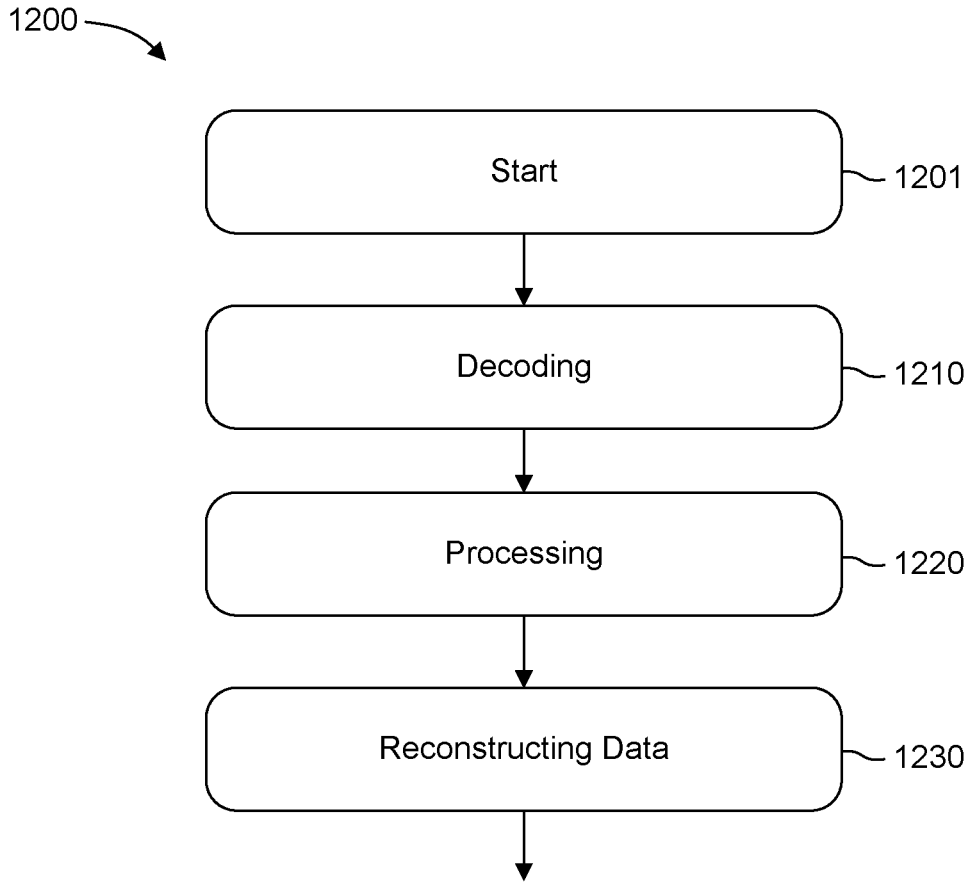
FIG. 12 illustrates one embodiment of a method for decoding video using the present principles.

One embodiment of a method 1200 for decoding video data is shown in FIG. 12. The method commences at Start block 1201 and proceeds to block 1210 for decoding motion information from a bitstream. The method proceeds to block 1220 for processing. The processing comprises at least one of down sampling said decoded motion information; determining a prediction of chrominance data based on said downsampled decoded motion information and chrominance data of at least one reference block; determining a prediction of luminance data based on said decoded motion information and luminance data of the at least one reference block and decoding residual information. The method proceeds to block 1230 for reconstructing a video block using the decoded residual information and the predictions.

Figure 13:
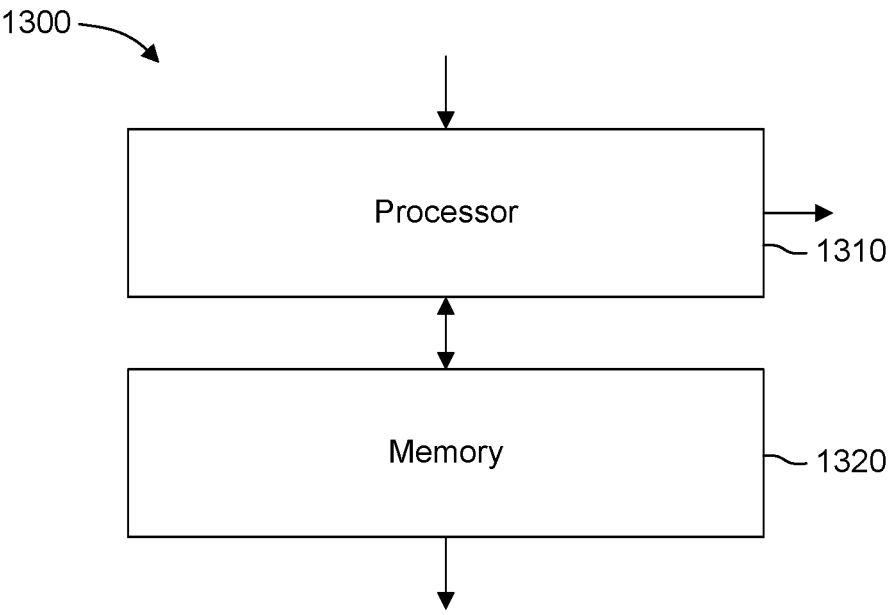
FIG. 13 illustrates one embodiment of an apparatus for encoding or decoding using the present principles.

FIG. 13 shows one embodiment of an apparatus 1300 for compressing, encoding or decoding video using coding or decoding tools. The apparatus comprises Processor 1310 and can be interconnected to a memory 1320 through at least one port. Both Processor 1310 and memory 1320 can also have one or more additional interconnections to external connections.

Processor 1310 is also configured to either insert or receive information in a bitstream and, either compressing, encoding, or decoding using the aforementioned methods.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 14:
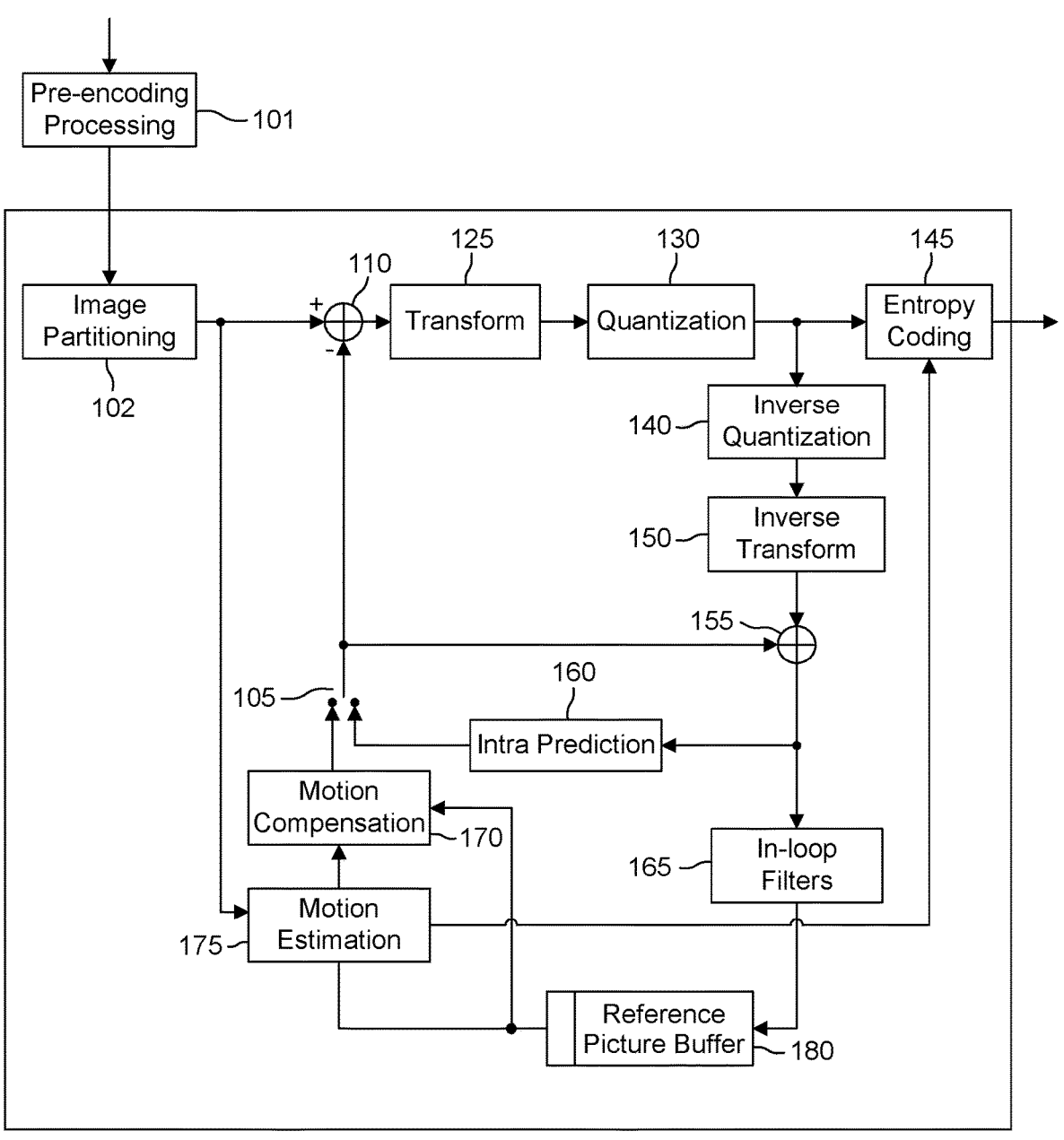
FIG. 14 illustrates a standard, generic video compression scheme.
Figure 15:
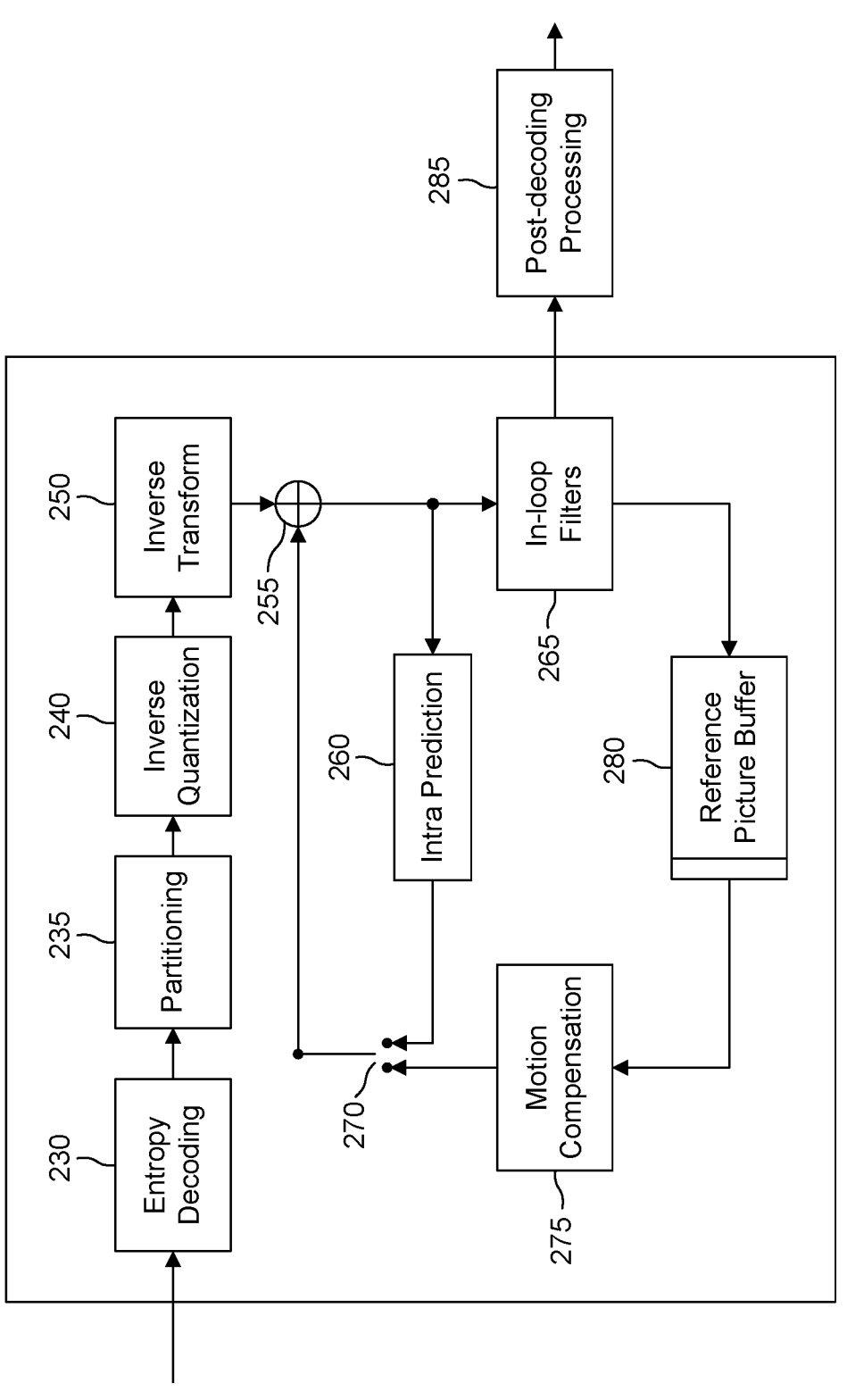
FIG. 15 illustrates a standard, generic video decompression scheme.
Figure 16:
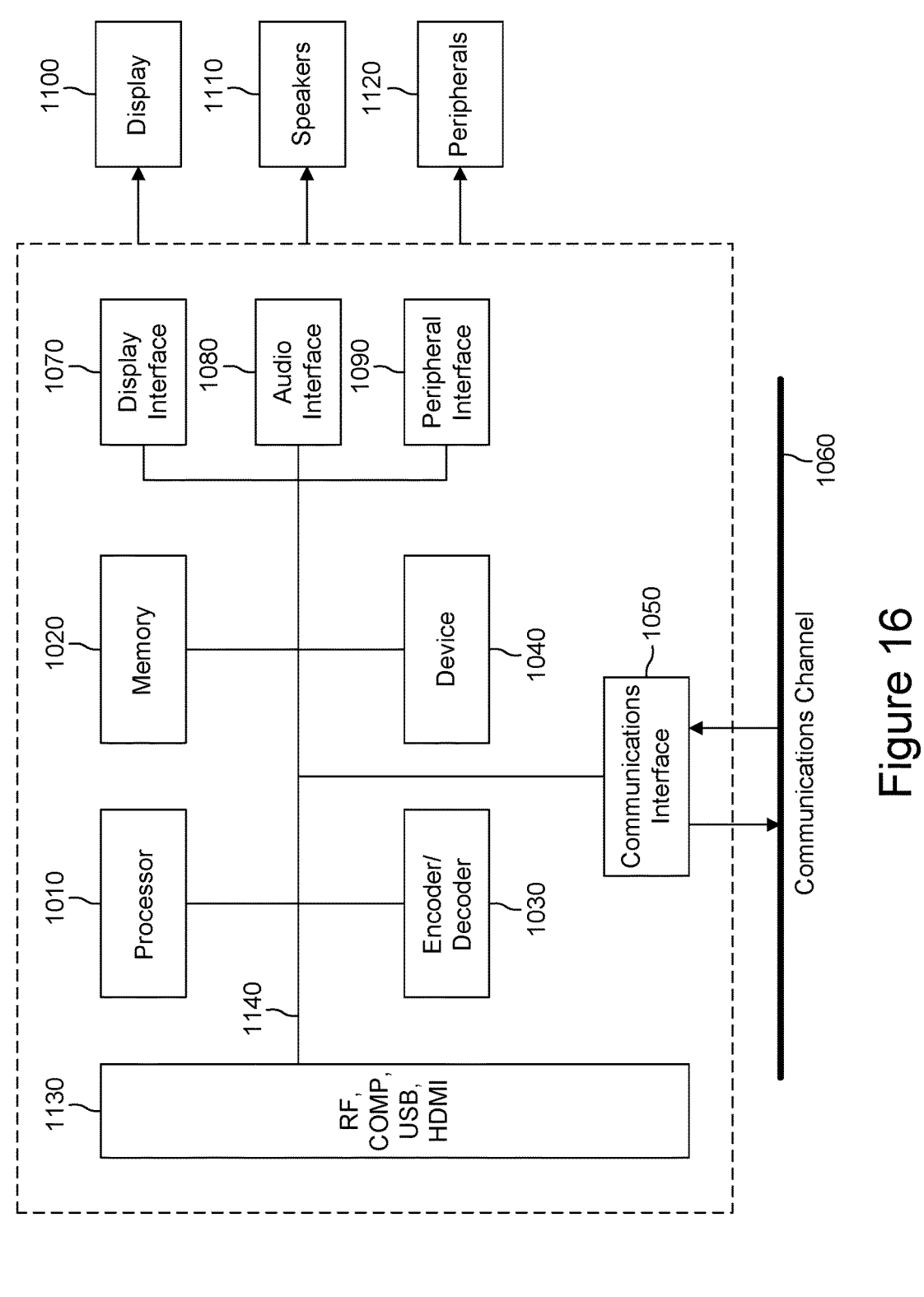
FIG. 16 illustrates a processor based system for encoding/decoding under the general described aspects.

The aspects described and contemplated in this application can be implemented in many different forms. FIGS. 14, 15, and 16 provide some embodiments, but other embodiments are contemplated and the discussion of FIGS. 14, 15, and 16 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, for example, the intra prediction, entropy coding, and/or decoding modules (160, 360, 145, 330), of a video encoder 100 and decoder 200 as shown in FIG. 14 and FIG. 15. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 14 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 15 illustrates a block diagram of a video decoder 200. In the decoder 200, a bitstream is decoded by the decoder elements as described below. Video decoder 200 generally performs a decoding pass reciprocal to the encoding pass as described in FIG. 14. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 16, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/ process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

Encoding and decoding of video information using luminance information to derive motion information for chrominance.

Using auto encoders for implementing the aforementioned encoding and decoding.

Using the aforementioned auto encoders with at least one reference frame.

Auto encoder video encoding and decoding on YUV 4:2:0 video formats.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising: concatenating luminance data of a current and at least one reference block; determining motion information from the concatenated luminance data; processing said determined motion information with a tanh function and a warping to generate a motion tensor; encoding said determined motion information; down sampling said encoded motion information; determining a prediction of chrominance data based on said downsampled encoded motion information, said motion tensor and chrominance data of the at least one reference block; determining a prediction of luminance data based on said encoded motion information, said motion tensor and luminance data of the at least one reference block; determining residual data of the current block based on said predictions; and, encoding said residual data into a bitstream also comprising said encoded motion information.

2. An apparatus, comprising: a processor, configured to: concatenate luminance data of a current and at least one reference block; determine motion information from the concatenated luminance data; process said determined motion information with a tanh function and a warping to generate a motion tensor; encode said determined motion information; down sample said encoded motion information; determine a prediction of chrominance data based on said downsampled encoded motion information, said motion tensor and chrominance data of the at least one reference block; determine a prediction of luminance data based on said encoded motion information, said motion tensor and luminance data of the at least one reference block; determine residual data of the current block based on said predictions; and, encode said residual data into a bitstream also comprising said encoded motion information.

3. A method, comprising:
decoding motion information from a bitstream;
down sampling said decoded motion information;
processing said decoded motion information with a tanh function and a warping to generate a motion tensor;
determining a prediction of chrominance data based on said downsampled decoded motion information, said motion tensor and chrominance data of at least one reference block;
determining a prediction of luminance data based on said decoded motion information, said motion tensor and luminance data of the at least one reference block;
decoding residual information; and,
reconstructing a video block using said decoded residual information and said predictions.

4. An apparatus, comprising:
a processor, configured to:
decode motion information from a bitstream;
down sample said decoded motion information;
process said decoded motion information with a tanh function and a warping to generate a motion tensor;
determine a prediction of chrominance data based on said downsampled decoded motion information, said motion tensor and chrominance data of at least one reference block;
determine a prediction of luminance data based on said decoded motion information, said motion tensor and luminance data of the at least one reference block;
decode residual information; and,
reconstruct a video block using said decoded residual information and said predictions.

5. The method of claim 1, wherein said encoding is performed using an auto encoder.

6. The method of claim 1, wherein said prediction comprises:
computing a Gaussian volume on at least one reference frame;
performing a tanh transformation on motion information; and, performing a warp function on said tanh function output to generate a prediction.

7. The method of claim 6 wherein said warping is separate for luminance and chrominance to generate a prediction.

8. The method of claim 1, wherein said luminance and chrominance data is in YUV 4:4:4 format.

9. The apparatus of claim 2, wherein a parametric model is used on the at least one reference block to generate a new block.

10. A device comprising:
an apparatus according to claim 1; and
at least one of (i) an antenna configured to receive a signal, the signal including the video block, (ii) a band limiter configured to limit the received signal to a band of frequencies that includes the video block, and (iii) a display configured to display an output representative of a video block.

11. A non-transitory computer readable medium containing data content generated according to the method of claim 1, for playback using a processor.

12. A computer program product comprising instructions which, when the program is executed by a computer, cause the computer to carry out the method of claim 1.

13. The method of claim 3, wherein said encoding and decoding is performed using an auto encoder.

14. The method of claim 3, wherein said prediction comprises:
computing a Gaussian volume on at least one reference frame;
performing a tanh transformation on motion information; and,
performing a warp function on said tanh function output to generate a prediction.

15. The method of claim 3, wherein said decoding of motion information comprises at least one transpose convolution and at least one rectified linear unit function.

16. The method of claim 14 wherein said warping is separate for luminance and chrominance to generate a prediction.

17. The apparatus of claim 4, wherein said luminance and chrominance data is in YUV 4:4:4 format.

18. The apparatus of claim 4, wherein a parametric model is used on the at least one reference block to generate a new block.

19. The method of claim 15, wherein said decoding is split into multiple branches for at least one convolutional layer.

* * * * *